US011193567B2

(12) United States Patent
Vazquez et al.

(10) Patent No.: US 11,193,567 B2
(45) Date of Patent: Dec. 7, 2021

(54) ACTUATOR ASSEMBLY

(71) Applicant: Schaeffler Technologies AG & Co. KG, Herzogenaurach (DE)

(72) Inventors: Andre Vazquez, Fort Mill, SC (US); Craig Hooker, Indian Land, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/856,708

(22) Filed: Apr. 23, 2020

(65) Prior Publication Data
US 2020/0340566 A1 Oct. 29, 2020

Related U.S. Application Data

(60) Provisional application No. 62/839,200, filed on Apr. 26, 2019.

(51) Int. Cl.
*F16H 37/04* (2006.01)
*F16H 49/00* (2006.01)
*F16H 1/46* (2006.01)

(52) U.S. Cl.
CPC .............. *F16H 37/041* (2013.01); *F16H 1/46* (2013.01); *F16H 49/001* (2013.01)

(58) Field of Classification Search
CPC ......... F16H 37/041; F16H 49/001; F16H 1/46
See application file for complete search history.

(56) References Cited

U.S. PATENT DOCUMENTS

| 2,966,808 A | | 1/1961 | Daniel | |
| 4,330,045 A | * | 5/1982 | Myers | B60L 3/0076 180/65.51 |
| 4,578,993 A | * | 4/1986 | Burandt | G01M 13/02 73/162 |
| 4,721,016 A | * | 1/1988 | Burandt | B64C 13/34 475/342 |

(Continued)

FOREIGN PATENT DOCUMENTS

DE  102006058133 A1 * 6/2008

OTHER PUBLICATIONS

Thingiverse.com. "66.46 : 1 Compound Planetary Gearbox for Robotic Arm by Gear_Down_For_What." Thingiverse, www.thingiverse.com/thing:2277105; Dated Apr. 27, 2017; Accessed Apr. 13, 2020.

*Primary Examiner* — Sherry L Estremsky
(74) *Attorney, Agent, or Firm* — Volpe Koenig

(57) ABSTRACT

An actuator assembly is disclosed herein. The assembly includes a motor shaft; support; harmonic drive connected to the motor shaft that includes an output connected to a drive shaft defining a first sun gear; drive mechanism; and actuator arm. The drive mechanism includes a first gear set and a second gear set. The first gear set has a first carrier including a second sun gear. The first carrier supports a first plurality of planetary gears that engage both the first sun gear and a first ring gear rotationally fixed to the support. The second gear set has a second carrier fixed to the support. The second carrier supports a second plurality of planetary gears that engage both the second sun gear and a second ring gear. The actuator arm is connected to the second ring gear such that the actuator arm is rotationally driven by the motor shaft.

12 Claims, 6 Drawing Sheets

(56) References Cited

U.S. PATENT DOCUMENTS

| | | | | |
|---|---|---|---|---|
| 4,768,400 | A * | 9/1988 | McKay | F16H 19/00 |
| | | | | 475/330 |
| 4,848,663 | A * | 7/1989 | Sherbrooke | F16H 1/46 |
| | | | | 239/265.19 |
| 4,932,613 | A | 6/1990 | Tiedeman et al. | |
| 5,120,285 | A * | 6/1992 | Grimm | F16H 1/46 |
| | | | | 475/342 |
| 7,008,343 | B2 * | 3/2006 | Nagasugi | F16H 1/46 |
| | | | | 475/83 |
| 7,552,664 | B2 | 6/2009 | Bulatowicz | |
| 9,586,457 | B2 * | 3/2017 | Jeon | B60G 21/0556 |
| 9,897,189 | B2 * | 2/2018 | Liang | F16H 49/001 |
| 10,641,377 | B2 * | 5/2020 | Frey | F16H 49/001 |
| 2010/0072725 | A1 * | 3/2010 | Woellhaf | B60G 21/0555 |
| | | | | 280/124.107 |

\* cited by examiner

ACTUATOR ASSEMBLY

INCORPORATION BY REFERENCES

The following document is incorporated by reference as if fully set forth herein: U.S. Provisional Patent Application No. 62/839,200, filed on Apr. 26, 2019.

FIELD OF INVENTION

The present disclosure relates to an actuator assembly.

BACKGROUND

Actuator systems are well known and can be implemented in a variety of configurations to accomplish the requisite output. Known actuator systems are disclosed in U.S. Pat. Nos. 2,966,808 and 4,932,613.

Generally, it is difficult to obtain a high drive ratio, i.e. over 100:1, in actuator systems unless the size of the actuator is increased. While it is possible to provide larger actuators to provide higher drive ratios, there is also a conflicting design consideration for actuators to simultaneously reduce the overall size of the system.

It would be desirable to provide an actuator system that is compact and also provides a high drive ratio.

SUMMARY

An improved actuator assembly is disclosed herein that has a relatively high ratio and reduced axial footprint.

In one embodiment, the assembly includes a motor configured to rotate a motor shaft, at least one support, a harmonic drive connected to the motor shaft, a drive mechanism, and an actuator arm.

The drive mechanism includes a first gear set and a second gear set. The first gear set has a first carrier including a second sun gear. The first carrier supports a first plurality of planetary gears that engage both the first sun gear and a first ring gear rotationally fixed to the at least one support.

The second gear set has a second carrier fixed to the at least one support. The second carrier supports a second plurality of planetary gears that engage both the second sun gear and a second ring gear.

The actuator arm is connected to the second ring gear such that the actuator arm is rotationally driven by the motor. The assembly provides a ratio of at least 600:1 between the motor shaft and the actuator arm.

In one embodiment, a collar is arranged between the actuator arm and the second ring gear. The collar is rotatable about a rotation axis (X1) of the motor shaft. The collar is rotatably supported via a plurality of bearing elements arranged between the collar and the at least one support.

In one embodiment, the motor is at least partially arranged inside of the at least one support. The at least one support can include a first support and a second support that is spaced away from the first support, and the second carrier is fixed to both the first support and the second support. In one embodiment, the actuator arm is arranged between the first support and the second support.

A drive shaft can be provided that connects the output and the first sun gear. A first bearing assembly can support a first axial end of the drive shaft and a second bearing assembly can support a second axial end of the drive shaft.

The second sun gear is arranged axially between the first sun gear and the motor shaft. The second plurality of planetary gears and the second ring gear are arranged axially between the first gear set and the motor shaft.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
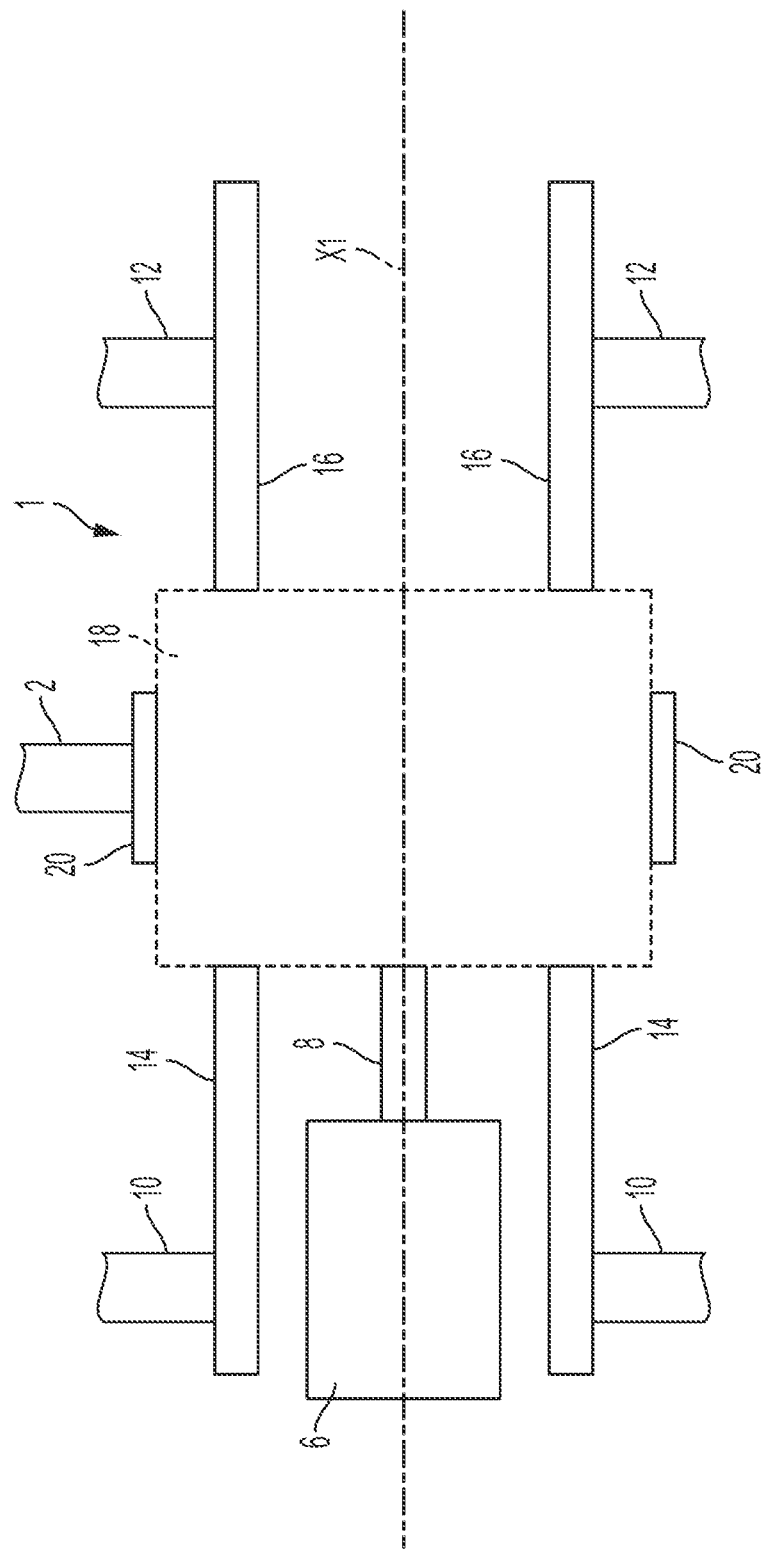
FIG. 1 is a schematic illustration of an actuator mechanism.
Figure 2:
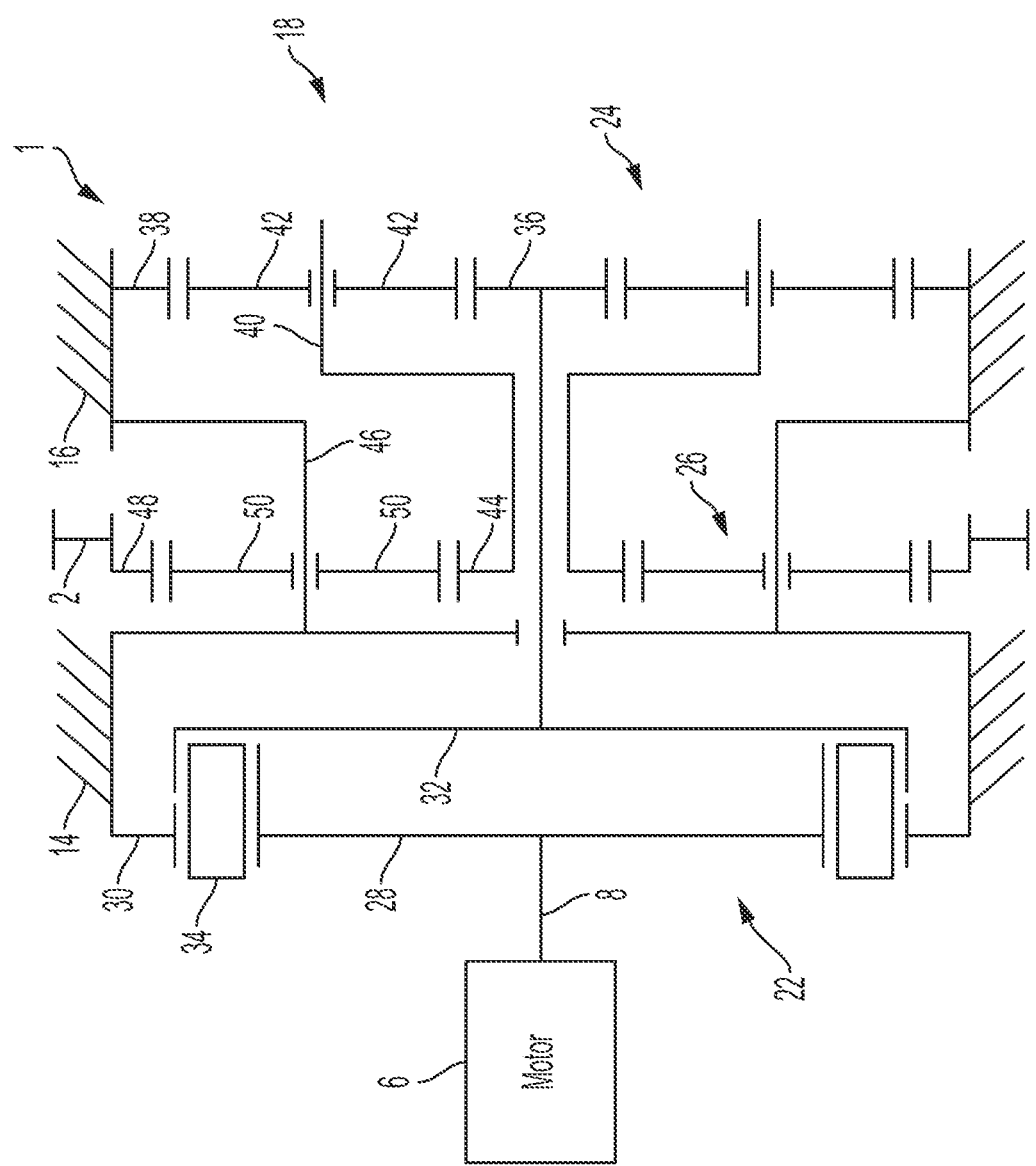
FIG. 2 is a schematic illustration of the actuator mechanism of FIG. 1.
Figure 3:
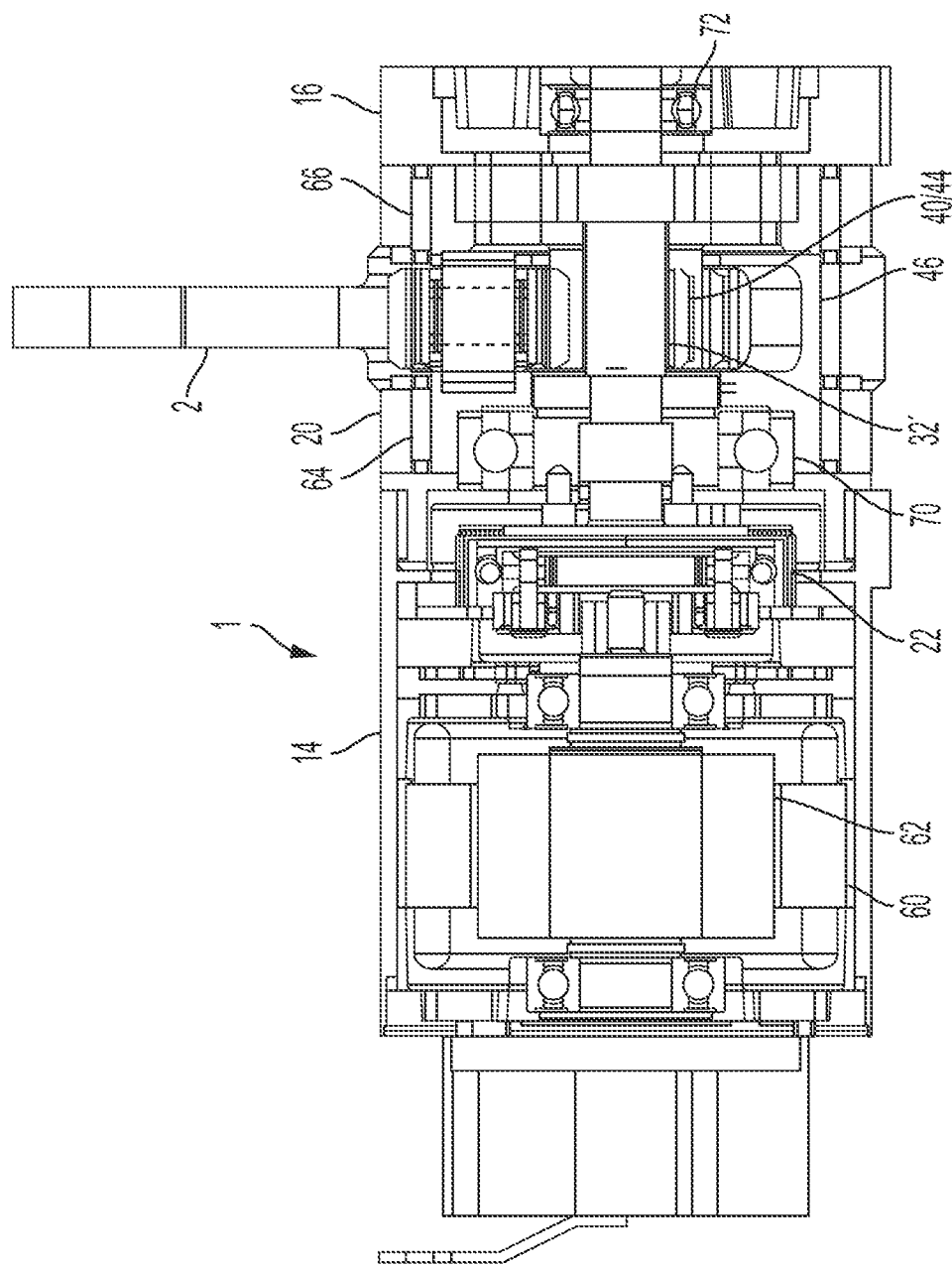
FIG. 3 is a cross section of the actuator mechanism of FIGS. 1 and 2.
Figure 4:
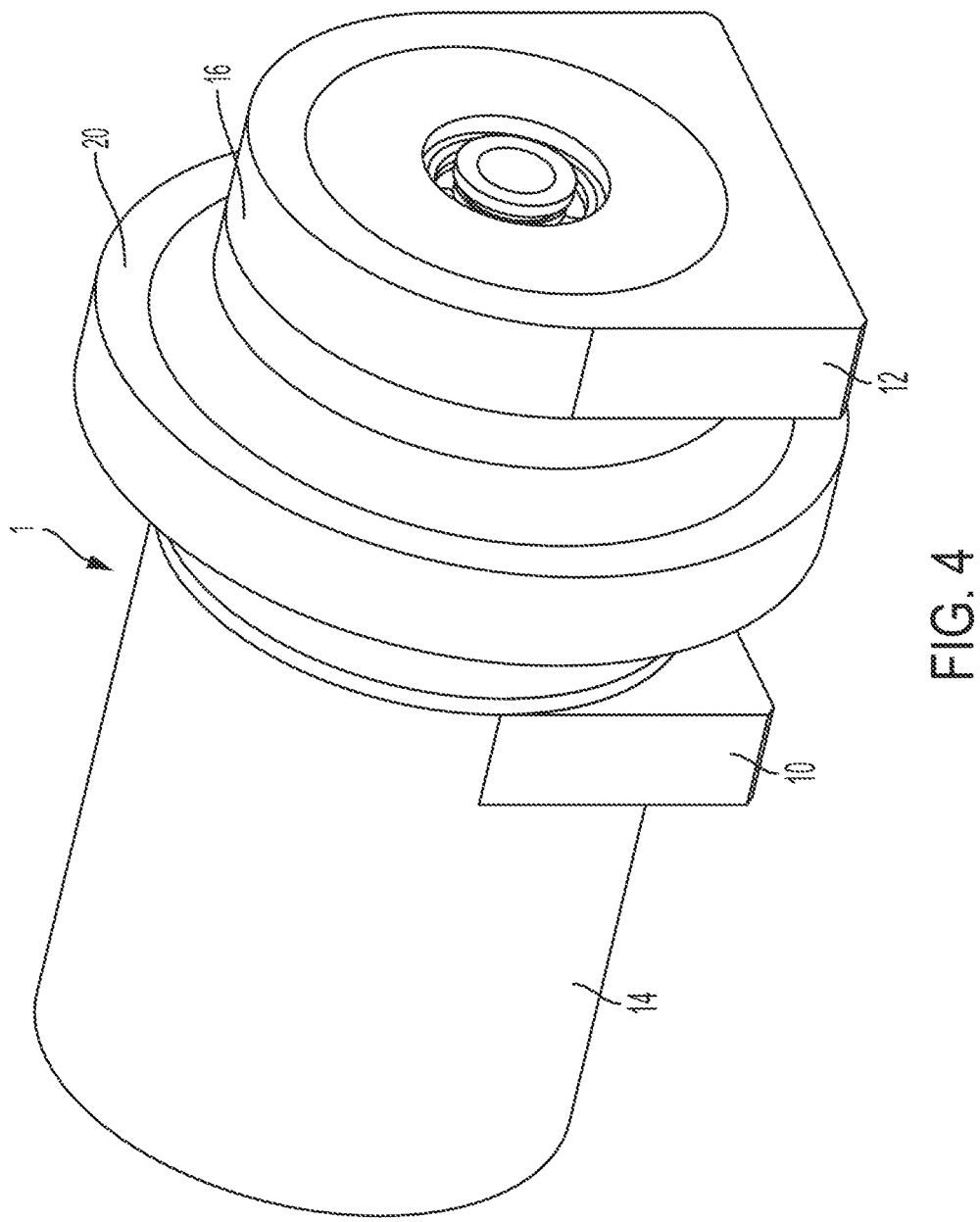
FIG. 4 is a perspective view of the actuator mechanism of FIGS. 1-3.
Figure 5:
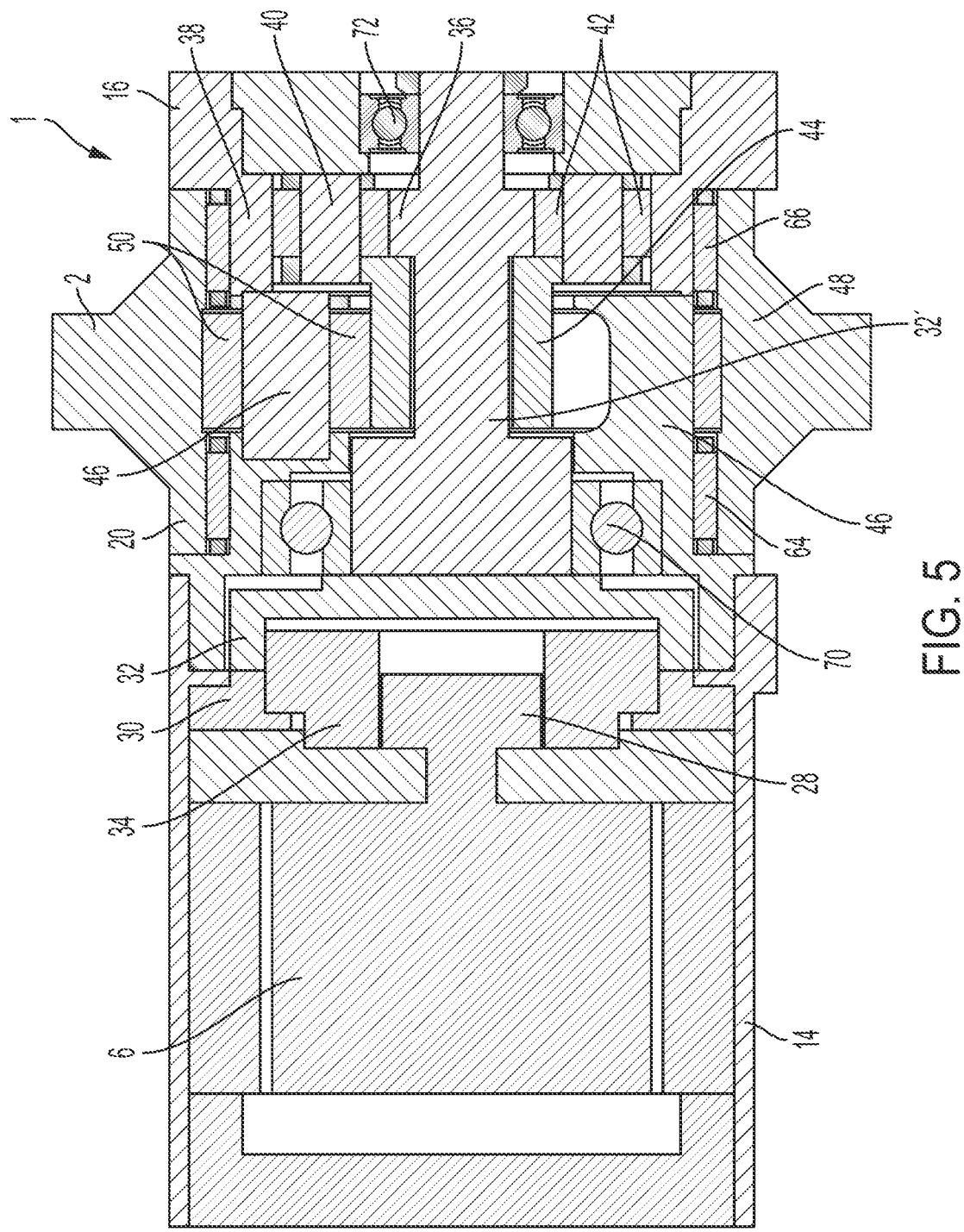
FIG. 5 is a cross-sectional view of the actuator mechanism of FIGS. 1-4.
Figure 6:
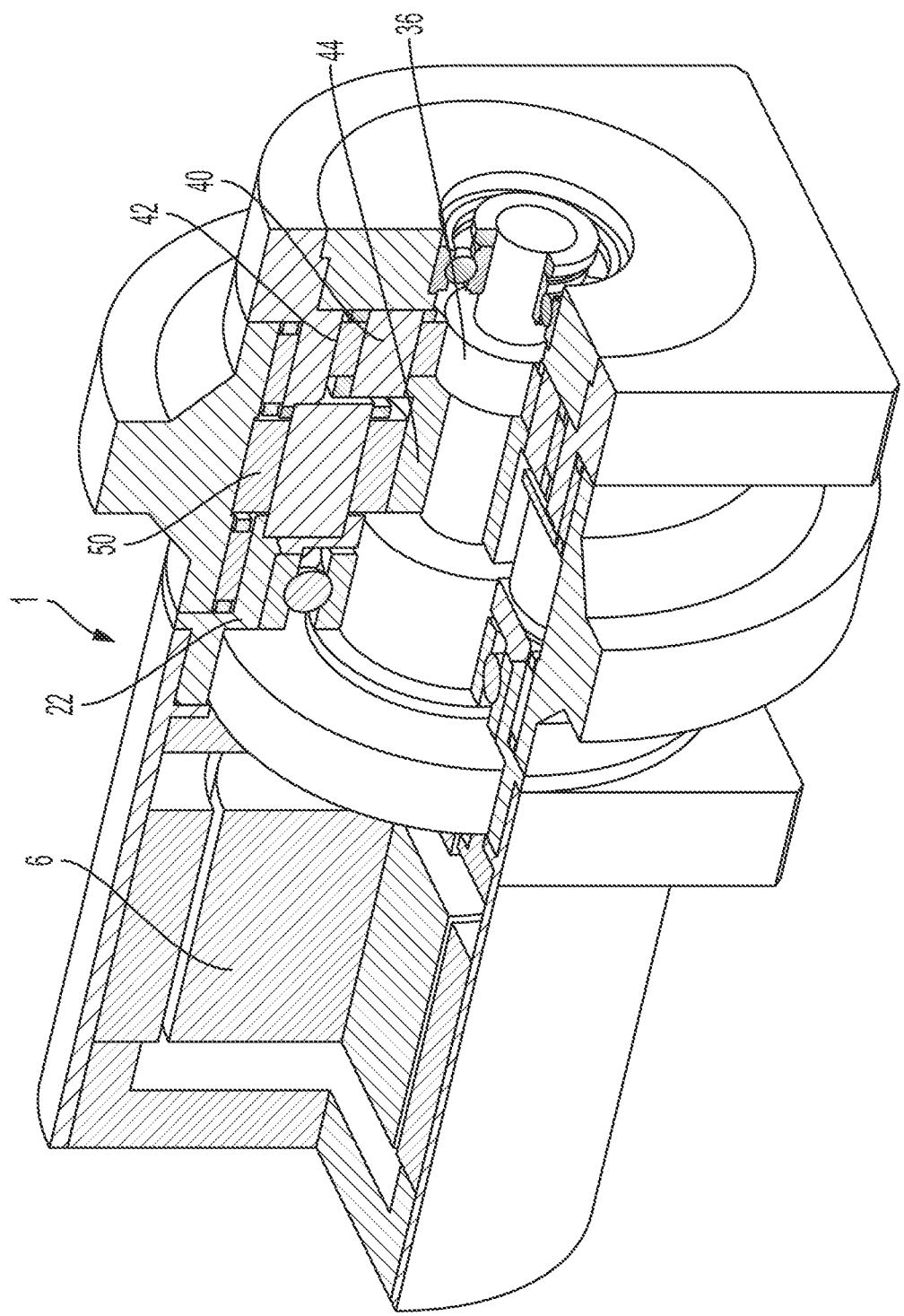
FIG. 6 is a perspective view showing a partial cross-section of the actuator mechanism of FIGS. 1-5.

FIGS. 1-6 illustrate various views of an actuator assembly 1. In one embodiment, the actuator assembly 1 includes a motor 6 configured to rotate a motor shaft 8. The motor 6 can be an electric motor or any other type of driving mechanism. A brake assembly can also be integrated with the motor 6, which can be integrated internally or externally onto the motor shaft 8. The motor shaft 8 can be separately formed or integrally formed with the motor 6.

As shown in in the drawings, the assembly 1 includes at least one support 14, 16. The at least one support 14, 16 is a fixed mounting apparatus that supports other components of the assembly 1, including the motor 6. The at least one support 14, 16 includes a first support 14 and a second support 16 that are axially separated from each other. The first support 14 and the second support 16 can be separately formed or integrally formed with each other.

In one embodiment, the motor 6 is at least partially arranged inside of the at least one support 14, 16. In one embodiment, the motor 6 is completely positioned inside of the first support 14. The first support 14 and the second support 16 can each be supported by a respective mount 10, 12. Although two supports 14, 16 and two mounts 10, 12 are illustrated in the drawings, one of ordinary skill in the art would understand that the quantity of these components can vary. The two supports 14, 16 can be rigidly connected to each other or integrally formed with each other.

A harmonic drive 22 is provided that essentially connects the motor shaft 8 to a drive mechanism 18 including multiple gears. The term harmonic drive is used herein to refer to a strain wave drive or other gear arrangement that is compact, light-weight and provides a high gear ratio. One such example of a harmonic drive is disclosed in U.S. Pat. No. 7,552,664, which is incorporated by reference. As used in this context with respect to the harmonic drive 22, the term high ratio means a ratio of at least 60:1.

The harmonic drive 22 is connected to the motor shaft 8, and the harmonic drive 22 includes an output 32 connected to a drive shaft 32' that defines a first sun gear 36. The harmonic drive 22 can include an input 28, such as an eccentric gear or elliptical gear, that is fixed to the motor shaft 8. A reaction element 30 is fixed to the at least one support 14, 16. The output 32 includes a set of teeth configured to engage with a corresponding set of teeth on a flex element 34. The set of teeth on the flex element 34 are also configured to engage teeth on the reaction element 30. The number of teeth on the reaction element 30 is different than the number of teeth on the output 32.

The drive mechanism 18 generally includes a first gear set 24 and a second gear set 26. In one embodiment, each of the gear sets 24, 26 includes a carrier, sun gear, ring gear, and set of planetary gears. The exact quantity and configuration of the carriers, sun gears, ring gears, and planetary gears can vary.

The first gear set 24 includes a first carrier 40 having a second sun gear 44. The first carrier 40 supports a first plurality of planetary gears 42 that engage both the first sun gear 36 and a first ring gear 38 rotationally fixed to the at least one support 14, 16.

The second gear set 26 includes a second carrier 46 fixed to the at least one support 14, 16. The second carrier 46 supports a second plurality of planetary gears 50 that engage both the second sun gear 44 and a second ring gear 48. In one embodiment, the second carrier 46 is fixed the first support 14.

In one embodiment, the second sun gear 44 is arranged axially between the first sun gear 36 and the motor shaft 8. The second plurality of planetary gears 50 and the second ring gear 48 can be arranged axially between the first gear set 24 and the motor shaft 8.

An actuator arm 2 is connected to the second ring gear 48, such that the actuator arm 2 is rotationally driven by the motor 6 by the intervening components. In one embodiment, a ratio of at least 500:1 is provided between the motor 6/motor shaft 8 and the actuator arm 2. The ratio can be at least 600:1 in one embodiment. In one embodiment, the actuator arm 2 is arranged between the first support 14 and the second support 16.

In one embodiment, a collar 20 is arranged between the actuator arm 2 and the second ring gear 48. The collar 20 can be integrally formed with either the actuator arm 2 and/or the second ring gear 48. The collar 20 is rotatable about a rotation axis (X1) of the motor shaft 8. In one embodiment, the collar 20 is rotatably supported via a plurality of bearing elements 64, 66 arranged between the collar 20 and the at least one support 14, 16.

The drive shaft 32' is connected to the output 32 and the first sun gear 36. A first bearing assembly 70 can support a first axial end of the drive shaft 32' and a second bearing assembly 72 can support a second axial end of the drive shaft 32'. Additional bearing assemblies can be arranged in the assembly 1 to support any one or more of the components. In one embodiment, the actuator arm 2 is concentric about the drive shaft 32'.

In another embodiment, the assembly 1 includes a motor 6 having a motor shaft 8, at least one support 14, 16, an output 32 that is connected to the motor shaft 8 and defines a first sun gear 36, a drive mechanism 18 and an actuator arm 2. The drive mechanism 18 includes two gear sets 24, 26 each having a plurality of planetary gears 42, 50 and at least one sun gear 36, 44. One of the gear sets 24 includes a first ring gear 38 that is rotationally fixed, and one of the gear sets 26 includes a second ring gear 48 that is rotatable. The actuator arm 2 is connected to the second ring gear 48, such that the actuator arm 2 is rotationally driven by the motor 6.

In one embodiment, the first gear set 24 provides a speed reduction of $(N_{s1}+N_{r1})/N_{s1}$ where $N_{s1}$ is a number of teeth of the first sun gear 36 and $N_{r1}$ is a number of teeth of the first ring gear 38.

In one embodiment, the second gear set 26 provides a speed reduction of $N_{r2}/N_{s2}$ where $N_{s2}$ is a number of teeth of the second sun gear 44 and $N_{r2}$ is a number of teeth of the second ring gear 48.

In one embodiment, the second ring gear 48 rotates in an opposite direction than a rotational direction of the second sun gear 44 and the other rotating components.

Although individual teeth are not specifically illustrated in the drawings, one of ordinary skill in the art would understand that all of the gear elements disclosed herein includes gear teeth.

The overall reduction ratio of the assembly 1 between the motor 6 and the actuator arm 2 is equal to a product of the reduction ratios provided by the harmonic drive 22, the first gear set 24, and the second gear set 26. Adjusting a number of gear teeth of the various components of these sub-assemblies provides an overall ratio of 600:1 in one embodiment.

The assembly 1 has a relatively reduced axial footprint by axially nesting components of the second gear set 26 around the output 32, and positioning the second gear set 26 axially between the motor 6 and the first gear set 24.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS actuator arm 2
motor 6
motor shaft 8
mounts 10, 12
supports 14, 16
drive mechanism 18
collar 20
harmonic drive 22
first gear set 24
second gear set 26
output 32 drive shaft 32'
flex element 34
first sun gear 36
first ring gear 38
first carrier 40
first plurality of planetary gears 42
second sun gear 44
second carrier 46
second ring gear 48
second plurality of planetary gears 50
plurality of bearing elements 64, 66
first bearing assembly 70
second bearing assembly 72
axis X1

What is claimed is:

1. An actuator assembly comprising:
   a motor configured to rotate a motor shaft;
   at least one support;
   a harmonic drive connected to the motor shaft, the harmonic drive including an input connected to the motor shaft, a reaction element fixed to the at least one support, and an output connected to a drive shaft that defines a first sun gear;
   a drive mechanism including:
     a first gear set having a first carrier including a second sun gear, the first carrier supporting a first plurality of planetary gears that engage both the first sun gear and a first ring gear rotationally fixed to the at least one support; and
     a second gear set having a second carrier fixed to the at least one support, the second carrier supporting a second plurality of planetary gears that engage both the second sun gear and a second ring gear; and
   an actuator arm connected to the second ring gear, such that the actuator arm is rotationally driven by the motor.

2. The actuator assembly of claim 1, further comprising a collar arranged between the actuator arm and the second ring gear.

3. The actuator assembly of claim 2, wherein the collar is rotatable about a rotation axis (X1) of the motor shaft.

4. The actuator assembly of claim 2, wherein the collar is rotatably supported via a plurality of bearing elements arranged between the collar and the at least one support.

5. The actuator assembly of claim 1, wherein a ratio of at least 500:1 between the motor shaft and the actuator arm is provided.

6. The actuator assembly of claim 1, wherein the motor is at least partially arranged inside of the at least one support.

7. The actuator assembly of claim 1, wherein the at least one support includes a first support and a second support that is spaced away from the first support, and the second carrier is fixed to the first support.

8. The actuator assembly of claim 1, wherein the at least one support includes a first support and a second support that is spaced away from the first support, and the actuator arm is arranged between the first support and the second support.

9. The actuator assembly of claim 1, wherein a first bearing assembly supports a first axial end of the drive shaft and a second bearing assembly supports a second axial end of the drive shaft.

10. The actuator assembly of claim 9, wherein the actuator arm is concentric about the drive shaft.

11. The actuator assembly of claim 1, wherein the second sun gear is arranged axially between the first sun gear and the motor shaft.

12. The actuator assembly of claim 1, wherein the second plurality of planetary gears and the second ring gear are arranged axially between the first gear set and the motor shaft.

* * * * *